June 25, 1963 — E. P. WARNKEN — 3,095,156
MACHINE FOR LAYING UP HOLLOW LAMINATED ARTICLES
Filed Nov. 5, 1959 — 3 Sheets-Sheet 1

INVENTOR.
ELMER P. WARNKEN
BY
Pearce and Schaefferklaus
ATTORNEYS

June 25, 1963 E. P. WARNKEN 3,095,156
MACHINE FOR LAYING UP HOLLOW LAMINATED ARTICLES
Filed Nov. 5, 1959 3 Sheets-Sheet 2
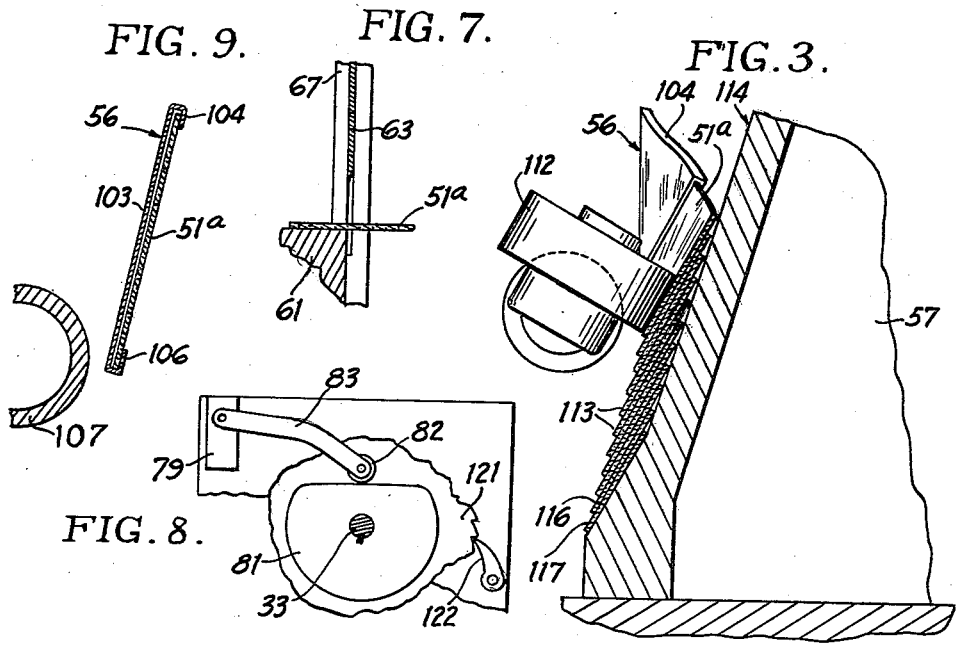
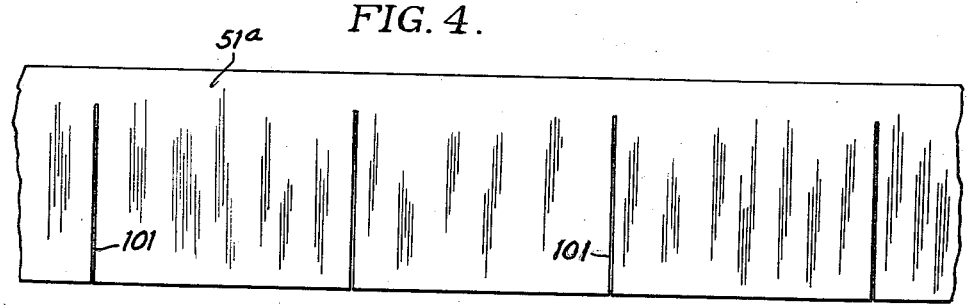
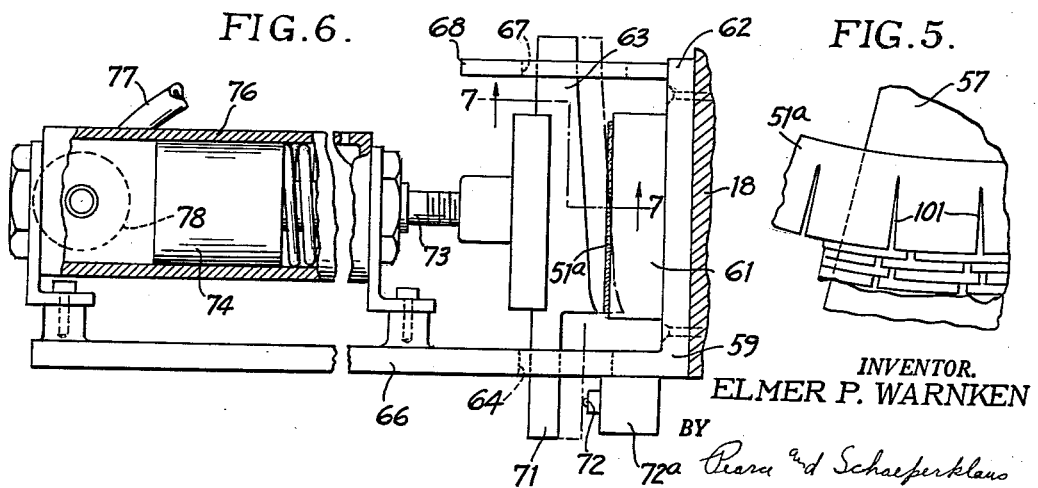
INVENTOR.
ELMER P. WARNKEN
BY
ATTORNEYS

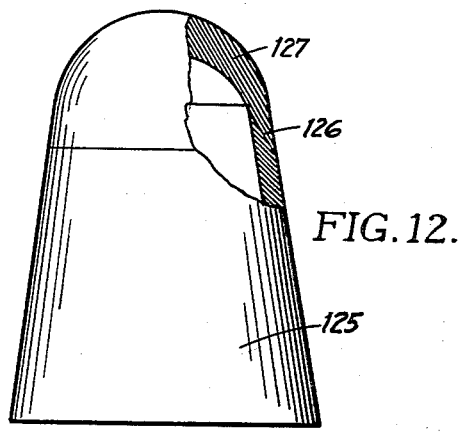
FIG. 12.
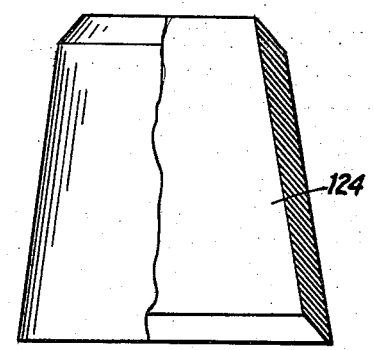
FIG. 11.
FIG. 10.
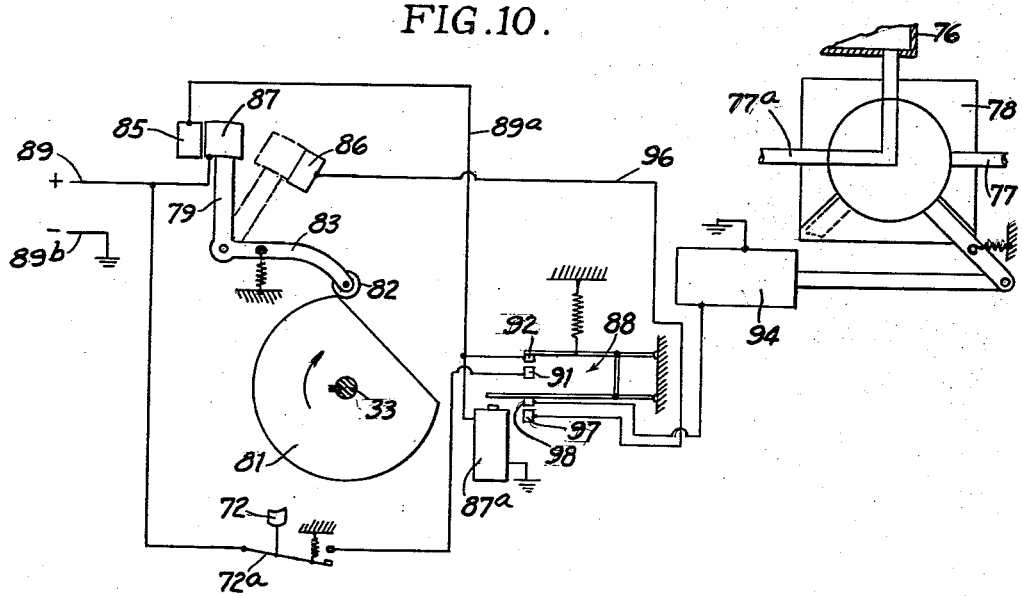
INVENTOR.
ELMER P. WARNKEN
BY
Pearce and Schaefperklaus
ATTORNEYS

United States Patent Office 3,095,156
Patented June 25, 1963

3,095,156
MACHINE FOR LAYING UP HOLLOW LAMINATED ARTICLES
Elmer P. Warnken, Cincinnati, Ohio, assignor to Studebaker-Packard Corporation, South Bend, Ind., a corporation of Michigan
Filed Nov. 5, 1959, Ser. No. 851,144
4 Claims. (Cl. 242—7)

This invention relates to a machine for forming laminated articles. More particularly, this invention relates to a machine for forming a laminated article from an elongated tape strip.

An object of this invention is to provide a machine for winding a tape strip on a mandrel to form a re-entry body or a rocket nozzle or the like of the type shown and claimed in my copending application Serial No. 734,345, filed May 9, 1958.

A further object of this invention is to provide a machine for winding a tape strip on a mandrel in helical layers to build up a hollow wall thereon.

A further object of this invention is to provide a machine of this type in which the tape is wound on the mandrel in overlapping layers or laminations which engage face-to-face and are displaced from each other so that an edge portion of each lamination is exposed.

A further object of this invention is to provide a machine of this type in which a device is provided which slits the exposed edge portion of the tape strip at intervals transversely thereof to permit the exposed edge to yield as the tape is wound or wrapped upon the mandrel.

The above and other objects and features of the invention will be apparent to those skilled in the art to which this invention pertains from the following detailed description, and the drawings, in which:

FIG. 3 is a view in section taken on the line 3—3 in FIG. 1;

FIG. 4 is a plan view of a section of a tape wound by the machine, the tape being shown with slits formed in an edge thereof;

FIG. 5 is a fragmentary view in side elevation, showing the tape being wound on the mandrel;

FIG. 6 is an enlarged view partly in section and partly in side elevation, showing the tape slitting device mounted on the machine;

FIG. 7 is a view in section taken on line 7—7 in FIG. 6;

FIG. 8 is a fragmentary view in section taken generally along the line 8—8 in FIG. 2;

FIG. 9 is a view in section taken along the line 9—9 in FIG. 1 showing a guide removed from its supports;

FIG. 10 is a schematic circuit diagram for the machine;

FIG. 11 is a view in side elevation, partly broken away and in section of a body for a nose cone molded on the machine before machining; and FIG. 12 is a view partly in side elevation and partly in section of a nose cone including a body and a nose piece.

In the following detailed description and the drawings, like reference characters indicate like parts.

Figure 2:
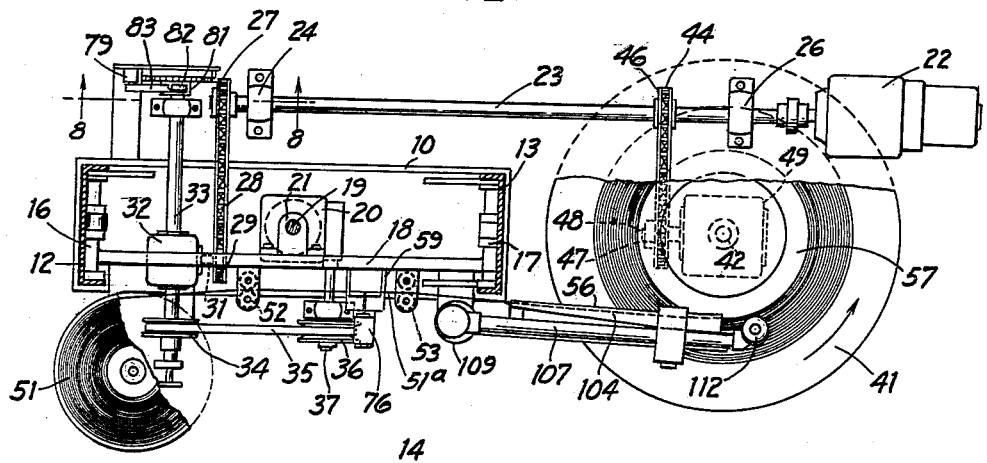
FIG. 2 is a plan view of the machine, parts of a tape roll, mandrel, frame, lead screw and table thereof being broken away to reveal interior construction, a tape slitting device being removed for clarity.
Figure 1:
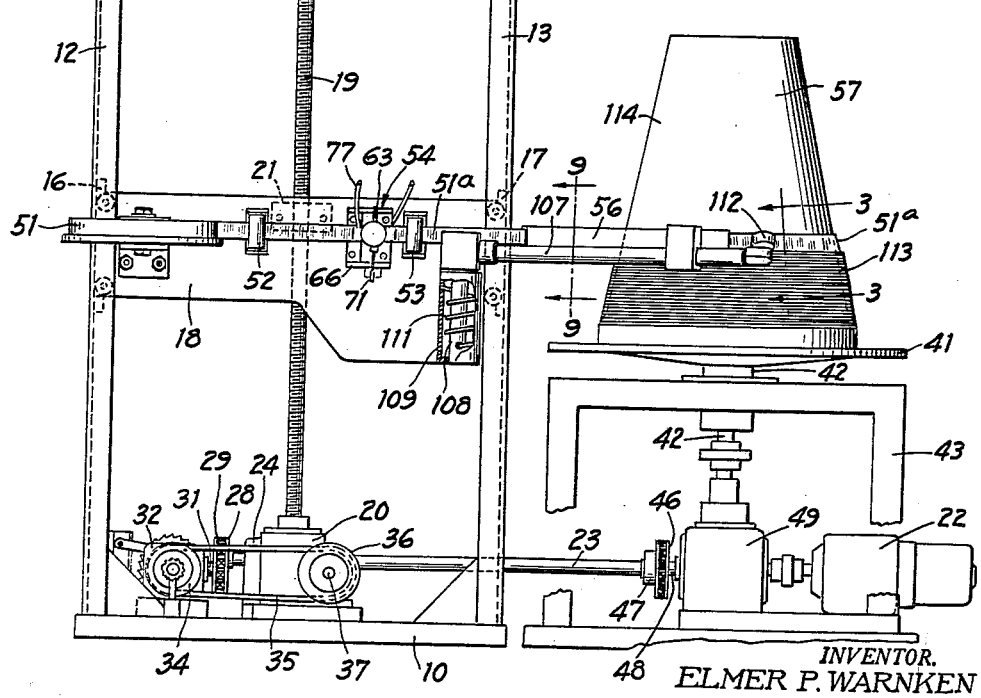
FIG. 1 is a view in front elevation of a machine constructed in accordance with an embodiment of this invention, a portion of frame members being broken away to reveal interior construction.

In FIG. 1 is shown a machine constructed in accordance with an embodiment of this invention. The machine includes a base 10 on which upright, channel-shaped tracks 12 and 13 are mounted. A cross member 14 links upper ends of the tracks 12 and 13. Track followers 16 and 17 (FIGS. 1 and 2) run in the tracks 12 and 13 respectively. The track followers 16 and 17 are spanned by a main frame or support plate 18 which moves up and down with the track followers. An upright lead screw 19 is journaled between a gear box 20 mounted on the base 10 and a bearing 20a mounted in the cross member 14. An internally threaded lead screw follower or nut 21 is attached to the frame plate 18 and meshes with the lead screw 19 so that, when the lead screw 19 turns, the frame plate moves up and down. The lead screw 19 is driven by a motor 22. The motor 22 drives a shaft 23 journaled in bearings 24 and 26. The shaft 23 carries a sprocket wheel 27 (FIG. 2) which drives a chain 28. The chain 28, in turn, drives a sprocket wheel 29 (FIG. 1) mounted on a shaft 31. The shaft 31, in turn, drives gears (not shown in detail) inside a gear box 32 (FIG. 2). The gears in the gear box 32 drive a cross shaft 33 on which a pulley 34 is mounted. The pulley 34 drives a belt 35 which, in turn, drives pulley 36. The pulley 36 is mounted on a shaft 37. The shaft 37 drives gears (not shown in detail) inside the gear box 20 which drive the upright lead screw 19 so that the motor 22 drives the lead screw 19 to raise and lower the frame plate 18.

The motor 22 also turns a table 41. The table 41 is rotatably mounted on an upright shaft 42 (FIG. 1). The shaft 42 is supported on appropriate bearings (not shown in detail), on a frame 43. The shaft 23 carries a second sprocket wheel 44 (FIG. 2) which drives a chain 46. The chain 46, in turn, drives a sprocket wheel 47 mounted on a stub shaft 48. The stub shaft 48 drives gears (not shown in detail) inside a gear box 49 to drive the upright shaft 42 so that the table rotates in timed relation to the raising and lowering of the frame plate 18.

A roll 51 of resin-impregnated tape is mounted on the frame plate 18. The tape can be formed of glass fiber cloth, asbestos fiber cloth, or other heat resistant fibrous material or the like. The tape is impregnated with a suitable thermo-setting resin such as a phenol formaldehyde resin. A strip 51a of the tape runs between guides 52 and 53 and passes a tape slitting device 54 (see FIG. 1). From the tape slitting device 54, the tape passes along a guide 56 to a mandrel 57. The mandrel 57 is mounted on and turns with the table 41.

Details of construction of the tape slitting device are shown in FIG. 6. The device includes a frame member or bracket 59 of L-shape which is attached to the frame plate 18. A stationary shear block 61 is mounted on an upright arm 62 of the bracket. As shown in FIGS. 6 and 7, the strip 51a of tape runs immediately in front of the shear block 61. A shear blade 63 is mounted for reciprocation crosswise of the tape strip and in shearing engagement with an edge of the shear block. The shear blade 63 is guided in a slot 64 in a lower arm 66 of the bracket 59 and by a slot 67 in an upper knife guide 68. The shear blade carries an extension 71 which reciprocates therewith and is engageable with a push-button 72 of a switch 72a when the shear blade advances from its full line position to the dotted-dash line portion of FIG. 6.

The shear blade 63 is mounted on a piston rod 73. The piston rod 73, in turn, is attached to a piston 74, which operates inside an air cylinder 76. Air reaches the air cylinder 76 from an air pressure line 77 through a valve 78. When the valve 78 is in position to connect the air pressure line 77 with the interior of the cylinder 76, the piston 74 is moved to the right as shown in FIG. 6 to cause the shear blade 63 to cut a slit in the tape strip 51a.

The valve 78 is controlled by a cam operated switch 79 (FIGS. 2 and 8) and the knife blade operated switch 72a. As shown in FIGS. 2 and 8, a cam 81 is mounted on the cross shaft 33. The cam 81 engages a cam follower 82 mounted on a switch operating arm 83. The switch arm 83 operates the switch 79 having two stationary contacts 85 and 86 (FIG. 10) each of which can be engaged by a movable contact 87. As the cam turns, the movable contact 87 engages the stationary contact 85 when the raised portion of the cam engages the cam follower. When the contacts 87 and 85 engage, the solenoid 87a of a relay 88 is energized by a circuit from a power lead 89 through contacts 87 and 85, a lead 89a, the solenoid 87a to ground and from ground to a second power lead 89b. When the relay closes, a hold-in circuit extending from the power lead 89 through the contacts of the push-button switch 72a and through contacts 91 and 92 of the relay 88 through the coil 87a of the relay 88 to ground, holds the relay 88 closed. Then, when the movable contact 87 of the cam operated switch 79 swings to the dot-dash line position of FIG. 10 to engage the stationary switch contact 86, a valve operating solenoid 94 is energized by a circuit extending from the power lead 89 through the switch contacts 87 and 86, a lead 96, switch contacts 97 and 98 of the relay 88, through the solenoid coil 94 to ground. Thus, when the cam 81 swings first to a position in which the contacts 85 and 87 are engaged and then to a position in which the contacts 86 and 87 engage, the valve 78 swings from the open position shown to a position in which the interior of the cylinder 76 is connected to the air pressure line 77 to cause the shear blade 63 to move to the shearing position (dot-dash line position of FIG. 6). Then, when the extension 71 of the shear blade 63 engages the switch button 72, the switch 72a (FIG. 10) is opened to release the holding circuit and permit the valve 78 to return to the position shown in FIG. 10 in which the interior of the cylinder 76 is connected to an exhaust line 77a and the shear blade returns to the full line position of FIG. 6. Thus, each time the cam 81 makes a turn, the shear blade makes one shearing advance. As the tape strip 51a passes the shear blade, a series of spaced slits 101 (FIG. 4) are formed therein. The slits are parallel to and extend transversely of the tape strip 51a and intersect only one edge or margin of the tape strip.

From the tape slitting device 54, the slit tape passes into the elongated guide 56. The guide 56 has an elongated body 103 and elongated flanges 104 and 106 along opposite edges of the body 103. The flanges 104 and 106 hold and guide the tape strip. The guide 56 is mounted on a support arm 107. The support arm 107 is carried by a pivot pin 108 (FIG. 1) which is pivotally mounted in a housing 109. The housing 109 is mounted on and moves up and down with the frame plate 18. A spring 111 (FIG. 1) mounted in the housing 109 urges the arm 107 and the guide 56 to swing counter clockwise as shown in FIG. 2, to hold a roller 112, which is rotatably mounted on the arm 107 in engagement with convolutions 113 (FIG. 3) of the tape strip as the tape is wound on the mandrel 57. As the mandrel 57 turns, the tape is wound on the outer face thereof. As shown, the mandrel has a main frusto-conic outer face 114 on which the tape is wrapped and a lower frusto-conic outer face 116 having a sharper angle with the axis of the mandrel. The first convolution 117 of the tape strip is laid on the face 116, and the face 116 determines the angle of the lay up. As the mandrel turns, the guide 56 moves upward as the tape is fed onto the revolving mandrel. As shown in FIG. 5, the slits 101 open to triangular shape as the tape strip is wound to permit the tape strip to follow the contour of the mandrel. The tape is laid up as shown in FIG. 3 with an edge portion of each convolution exposed and with the convolutions or laminations in overlapping, face-to-face relation. As shown in FIG. 8, a ratchet 121 mounted on the shaft 33 cooperates with a pawl 122 to prevent inadvertent reverse turning of the table or lowering of the tape guide during the laying up operation.

When the laminations of the strip have been wound on the mandrel for the length of the mandrel, the laminations are molded and the resin thereof is set and cured in the usual manner to form a molded hollow, generally frusto-conic body 124 (FIG. 11). The outer face of the wall of the body 124 can be machined to eliminate irregularities to form a machined body 125 and to form a face 126 (FIG. 12), thereon for receiving a nose piece 127. The nose piece can be formed of resin-impregnated glass fiber cloth laminations and can be adhesively attached to the body. The body can be attached or connected to the remainder of a missile or the like (not shown) by any appropriate means, (not shown).

The mandrel shown in the drawings is of generally frusto-conic overall shape. However, if it is desired to form a body which is cylindrical in shape, a mandrel can be used which is cylindrical in shape. If it is desired to lay up a hollow, annular wall of other shape, a mandrel of such other shape can be used.

The machine illustrated in the drawings and described above is subject to structural modification without departing from the spirit and scope of the appended claims.

Having described my invention, what I claim as new and desire to secure by Letters Patent is:

1. A machine for laying-up a resin impregnated tape to form a hollow annular wall having laminations sloping with respect to the axis thereof which comprises a main frame, a mandrel rotatably mounted on said main frame, means for rotating said mandrel, a guide frame mounted on the main frame and advanceable along the main frame substantially parallel to the axis of the mandrel, a source of tape mounted on said guide frame, means mounted on said guide frame adjacent the source of tape for cutting spaced slits in the tape extending transversely thereof and intersecting one lengthwise edge thereof as the tape is drawn from the source of tape, a guide mounted on the guide frame and receiving tape from the slit cutting means, said guide including a body and a pair of spaced parallel guide portions, said guide portions embracing opposite lengthwise edges of the tape to keep edges of the slit tape in parallelism, said guide extending from adjacent the slit cutting means to adjacent the mandrel and directing the tape to the mandrel with the tape extending substantially tangentially of the mandrel, and means for advancing the guide frame to advance the guide lengthwise of the mandrel in timed relation to the mandrel rotating means, the rate of rotation of the mandrel being so timed that the tape is wound on the mandrel in overlapping face-to-face convolutions with an edge portion along the slit edge of each convolution exposed, the slits opening as the tape leaves the guide and the laminations are wound on the mandrel.

2. A machine for laying-up a resin impregnated tape to form a hollow annular wall having laminations sloping with respect to the axis thereof which comprises a main frame, a mandrel rotatably mounted on said main frame, means for rotating said mandrel, a track mounted on the main frame adjacent said mandrel and extending substantially parallel to the axis of said mandrel, a support plate mounted on said track for movement lengthwise of the axis of the mandrel, a source of tape mounted on said support plate, means mounted on the support plate adjacent the source of tape for cutting spaced slits in the tape extending transversely thereof and intersecting one lengthwise edge thereof as the tape is withdrawn from the source of tape, an elongated guide pivotally mounted on the support plate and receiving the tape as the tape leaves the slit cutting means and directing the tape to the mandrel said guide including a body and a pair of spaced inwardly facing channel-shaped guide portions, said guide portions embracing opposite lengthwise edges of the tape to keep edges of the slit tape in parallelism as the tape advances from the slit cutting means to the mandrel, said guide extending from adjacent the slit cutting means to adjacent the mandrel, a roller mounted on the guide and engageable with tape on the mandrel to position the guide with the tape extending substantially tangentially of the mandrel, means for resiliently urging the guide in a direction to bring the roller into engagement with tape on the mandrel, and means for advancing the support plate lengthwise of the axis of the mandrel in timed relation to the mandrel rotating means, the rate of rotation of the mandrel being so timed that the tape is wound on the mandrel in overlapping face-to-face convolutions with an edge portion along the slit edge of each convolution exposed, the slits opening as the tape leaves the guide and the laminations are wound on the mandrel.

3. A machine for laying-up a resin impregnated tape to form a hollow annular wall having laminations sloping with respect to the axis thereof which comprises a main frame, a mandrel rotatably mounted on the main frame, means for rotating said mandrel, a track mounted on the main frame adjacent said mandrel and extending substantially parallel to the axis of said mandrel, a support plate mounted on said track for movement lengthwise of the axis of the mandrel, a source of tape mounted on said support plate, means mounted on the support plate adjacent the source of tape for cutting spaced slits in the tape extending transversely thereof and intersecting one lengthwise edge thereof as the tape is withdrawn from the source of tape, an elongated guide pivotally mounted on the support plate receiving the tape from the slit cutting means and directing the tape to the mandrel, said guide including a body and a pair of spaced inwardly facing, channel-shaped guide portions, said guide portions embracing opposite lengthwise edges of the slit tape in parallelism as the tape advances from the slit cutting means to the mandrel, said guide extending from adjacent the slit cutting means to adjacent the mandrel, means mounted on the guide and engageable with tape on the mandrel to position the guide with the tape extending substantially tagentially of the mandrel, means for urging the guide in a direction to bring the tape engaging means into engagement with tape on the mandrel, and means for advancing the support plate lengthwise of the axis of the mandrel in timed relation to the mandrel rotating means, the rate of rotation of the mandrel being so timed that the tape is wound on the mandrel in overlapping face-to-face convolutions with an edge portion along the slit edge of each convolution exposed, the slits opening as the tape leaves the guide and the laminations are wound on the mandrel.

4. A machine for laying-up a resin impregnated tape to form a hollow annular wall having laminations sloping with respect to the axis thereof which comprises a main frame, a mandrel rotatably mounted on the main frame, means for rotating said mandrel, a track mounted on the main frame adjacent said mandrel and extending substantially parallel to the axis of said mandrel, a support plate mounted on said track for movement lengthwise of the axis of the mandrel, a source of tape, means adjacent the source of tape for cutting spaced slits in the tape extending transversely thereof and intersecting one lengthwise edge thereof as tape is withdrawn from the source of tape, an elongated guide pivotally mounted on the support plate and adapted to receive the tape as the tape leaves the slit cutting means and direct the tape to the mandrel, said guide including a body and a pair of spaced inwardly facing, channel-shaped guide portions, said guide portions embracing opposite lengthwise edges of the tape to keep edges of the slit tape in parallelism as the tape advances from the slit cutting means to the mandrel, said guide extending from adjacent the slit cutting means to adjacent the mandrel, means mounted on the guide and engageable with tape on the mandrel to position the guide with the tape extending substantially tangentially of the mandrel, means for urging the guide in a direction to bring the tape engaging means into engagement with tape on the mandrel, and means for advancing the support plate lengthwise of the mandrel in timed relation to the mandrel rotating means, the rate of rotation of the mandrel being so timed that the tape is wound on the mandrel in overlapping face-to-face convolutions with an edge portion along the slit edge of each convolution exposed, the slits opening as the tape leaves the guide and the laminations are wound on the mandrel.

References Cited in the file of this patent

UNITED STATES PATENTS

| | | |
|---|---|---|
| 1,215,934 | Heckman | Feb. 13, 1917 |
| 1,700,099 | Shively | Jan. 22, 1929 |
| 1,734,136 | Kramer | Nov. 5, 1929 |
| 1,807,869 | Okey | June 2, 1931 |
| 1,849,270 | Bolger | Mar. 15, 1932 |
| 2,377,608 | Bronson | June 5, 1945 |
| 2,461,231 | Oppenheim | Feb. 8, 1949 |
| 2,744,043 | Ramberg | May 1, 1956 |
| 2,786,435 | Ellzey | Mar. 26, 1957 |
| 2,792,324 | Daley et al. | May 14, 1957 |
| 2,837,456 | Parilla | June 3, 1958 |